US007760599B2

(12) United States Patent
Ito et al.

(10) Patent No.: US 7,760,599 B2
(45) Date of Patent: Jul. 20, 2010

(54) OPTICAL DISK APPARATUS AND DISK ROTATION SPEED CONTROL METHOD THEREOF

(75) Inventors: Masamichi Ito, Fujisawa (JP); Hiroshi Minoda, Yokohama (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 511 days.

(21) Appl. No.: 11/685,295

(22) Filed: Mar. 13, 2007

(65) Prior Publication Data

US 2008/0082994 A1 Apr. 3, 2008

(30) Foreign Application Priority Data

Oct. 2, 2006 (JP) ............................ 2006-270999

(51) Int. Cl.
*G11B 7/00* (2006.01)

(52) U.S. Cl. ............. 369/53.14; 369/44.29; 369/47.44; 369/53.18

(58) Field of Classification Search ............. 369/53.14, 369/47.36, 47.38, 47.44, 47.45, 47.46, 53.18, 369/47.39, 53.28, 44.29
See application file for complete search history.

(56) References Cited

U.S. PATENT DOCUMENTS 6,631,105 B1 * 10/2003 Fukuda et al. ........... 369/47.44
6,785,208 B1 * 8/2004 Fujimoto et al. ......... 369/53.18
2005/0073924 A1 * 4/2005 Yamashiro .............. 369/47.36

FOREIGN PATENT DOCUMENTS

JP 2005-092961 4/2005
JP 2005-116042 4/2005

* cited by examiner

*Primary Examiner*—Thang V Tran
*Assistant Examiner*—LaTanya Bibbins
(74) *Attorney, Agent, or Firm*—Antonelli, Terry, Stout & Kraus, LLP.

(57) ABSTRACT

In an optical disk apparatus and a disk rotation speed control method thereof, enabling to rotate a disk at high speed, with stability and certainty, irrespective of mass eccentricity thereof, detection is made on the greatest value and the smallest value on the signal after conducting a process of a band pass filter 511 on a lens error signal in a step response of a pickup, with using a wobble signal in the place of a tracking error signal and chaining an offset, when controlling the rotation speed of the apparatus by loading an optical disk therein, and thereafter, determination is made on whether the disk rotation speed be shifted to the high speed or not, upon basis of a value obtained through comparison of the maximum value (Max_spnup) and the minimum value (Min_spnup) obtained with the greatest value (Max_step) and said smallest value (Min_step) memorized, when shifting the disk rotation to the high speed.

$$X=(\text{Max\_}spnup-\text{Min\_}spnup)/(\text{Max\_step}-\text{Min\_step})$$

12 Claims, 4 Drawing Sheets

43
3
44
21
41
42
4
2
BASE
45
1
5
6
40
AFF
CALCULATION
410
50
DSP
51
CPU
60
DRIVER1
SIN WAVE
502
SW1
SW2
TE
COMPENSATOR
TRD
501
504
505
511
512
OFFSET
503
LE
BPF
Reg
515
TARGET FREQUENCY
+
−
reg2
GAIN
516
514
FREQUENCY DETECT
513
FG
SPD
DRIVER2
70

OPTICAL DISK APPARATUS AND DISK ROTATION SPEED CONTROL METHOD THEREOF

BACKGROUND OF THE INVENTION

1. Field of the Invention

The present invention relates to a method for controlling a disk rotation speed within an optical disk apparatus for recording/reproducing information onto/from an optical information recording medium, and it relates, in particular, to an optical disk apparatus and a disk rotation speed control method thereof, for controlling the rotation speed of an optical disk by taking the mass eccentricity of the optical disk into the consideration thereof.

2. Description of the Related Arts

In an optical disk apparatus enabling to record/reproduce information onto/from an optical information recording medium, such as, an optical disk, for example, recording/reproducing of the information is made by irradiating a laser beam upon the information recording surface thereof, or detecting the reflection light thereon, while rotating the optical disk at high speed. On the optical disk to be rotated at the high speed within such the optical disk apparatus, the gravity position thereof sometimes comes off from a central position of rotation thereof, due to reasons, such as, adhesion of a label, or in the manufacturing process thereof, etc. (hereinafter, being called the "mass eccentricity"). When rotating such the optical disk having such the mass eccentricity at the high speed, the optical disk apparatus brings about vibration within an inner mechanism thereof, and accompanying with this, generating noises, and there is a possibility of failing to conduct a correct focus control. Further, there is also a possibility the optical disk is damaged or broken within the optical disk apparatus.

Conventionally, as a method for detecting such the mass eccentricity of the optical disk, in general, detection is made on the vibration generated accompanying with rotation of the disk. Also, conventionally, a lens error signal is detected as a signal indicative of a lens shift of a tracking actuator (hereinafter, being called a "lens shift indication signal"), or obtaining it from a tracking error signal, thereby detecting the mass eccentricity of the optical disk. However, in that instance, there is a problem that the tracking error signal leaks into the lens shift indication signal, such as, the lens error signal, etc., thereby erroneously detecting the mass eccentricity.

Then, as is known, in Japanese Patent Laying-Open No. 2005-92961 (2005) and Japanese Patent Laying-Open No. 2005-116042 (2005), for example, it is already to let the lens shift indication signal, such as, the lens error signal, etc., thereby preventing it from leaking into the lens error signal.

SUMMARY OF THE INVENTION

By the way, although the conventional arts mentioned above, it tries to prevent the tracking error signal from leaking into the lens error signal with the signal processing by means of the band pass filter (BPF), however it is difficult to prevent the tracking error signal from leaking therein at the frequency band where the frequency of the lens error signal can pass through the BPF (i.e., a passing region or band). Thus, it is difficult to inhibit the erroneous detection of the mass eccentricity of the disk due to the leakage of the tracking error signal into the lens error signal, with certainty.

Also, further, sensitivity and/or vibration characteristics of the lens error signal within each the optical disk apparatus has it's own un-uniformity (i.e., variation), for that reason, there is a problem that accuracy on detection of the mass eccentricity is also un-uniform in the characteristic (i.e., variable). In particular, in recent years, upon the optical disk apparatus enabling to record/reproduce information onto/from the optical disk, as the information medium, demands are made remarkable for thin-sizing and/or a low pricing, and for that reason, a base mounting thereon a spindle motor for rotationally driving the optical disk is also thin in the thickness thereof or it made of a plastic, etc., therefore un-uniformity factors becomes large on the vibration characteristics or the sensitivity and of the sensitivity of the lens error signal within the optical disk apparatus. Therefore, with the conventional optical disk apparatus, it is impossible to achieve a stable disk rotation speed control, including the optical disk of such mass eccentricity therein, and there are problems of generation of the noises when the disk rotates at high rotation speed, and instability in the recording/reproducing operation thereof, etc.

Then, according to the present invention, by taking the problems with the conventional arts mentioned above, an object thereof is to achieve a stable disk rotation speed control, reducing the signal leakage, i.e., the lens error signal or the like into the lens shift indication signal, with certainty, as well as, reducing the various kinds of un-uniformities mentioned above, thereby detecting the mass eccentricity of the optical disk, with certainty, and further thereby to provide an optical disk apparatus and a disk rotation speed control method thereof, for enabling superior recording/reproducing operation of information onto/from the optical disk.

For accomplishing the object mentioned above, according to the present invention, first of all, there is provided an optical disk apparatus, comprising: a spindle motor to mount an optical disk thereon, for rotational driving thereof; a pickup movable into a radial direction of the optical disk being rotationally driven by said spindle motor; a rotation speed control means for controlling a rotation speed of said spindle motor; and a pickup movement controller means for controlling movement of said pickup, thereby recording/reproducing information through irradiating a laser beam upon an information recording surface of the optical disk, further comprising: a signal generator portion for generating at least a tracking error signal and a lens shift indication signal upon reflected light of the laser beam irradiated from said pickup; and a signal process portion for controlling said rotation speed control means and said pickup movement controller means, upon basis of the tracking error signal and the lens shift indication signal from said signal generator portion, wherein said signal process portion comprises a mass eccentricity detection mode, detecting a greatest value and a smallest value on a signal after conducting a band pass filter process upon said lens shift indication signal in a step response of said pickup, to be memorized, with using a predetermined high-frequency signal, in place of said tracking error signal, and by changing an offset thereof, when controlling the rotation speed after loading the optical disk into said apparatus, and thereafter, detecting a maximum value and a minimum value on a signal after conducting band pass filter process upon said lens shift indication signal obtained from said signal generator portion, when shifting the disk rotation speed to a high speed, and thereby determining on whether the disk rotation speed be shifted to the high speed or not, upon basis of a value obtained through comparison of said maximum value and said minimum value obtained with said greatest value and said smallest value memorized.

Also, according to the present invention, within the optical disk apparatus as described in the above, preferably, said signal process portion has means for memorizing the greatest value and the smallest value to be memorized, or the predetermined high-frequency signal to be used in the place of said tracking error signal is a wobble signal. Or, preferably, the value obtained through comparison of said maximum value (Max_spnup) and said minimum value (Min _spnup) obtained with said greatest value (Max_step) and said smallest value (Min_step) memorized is expressed by the following equation:

$$X=(\text{Max\_}spnup-\text{Min\_}spnup)/(\text{Max\_step}-\text{Min\_step})$$

And, according to the present invention, preferably, said signal process portion shifts into a tracking control mode after completing said mass eccentricity detection mode. In addition thereto, it is preferable that said lens shift indication signal is the lens error signal.

And, according to the present invention, for also accomplishing the object mentioned above, there is further provided a disk rotation speed control method in an optical disk apparatus, comprising: a spindle motor to mount an optical disk thereon, for rotational driving thereof; a pickup movable into a radial direction of the optical disk being rotationally driven by said spindle motor; a rotation speed control means for controlling a rotation speed of said spindle motor; and a pickup movement controller means for controlling movement of said pickup, thereby recording/reproducing information through irradiating a laser beam upon an information recording surface of the optical disk, comprising the following steps of: a step for detecting a greatest value and a smallest value on a signal after conduction a band pass filter process upon said lens shift indication signal in a step response of said pickup, to be memorized, with using a predetermined high-frequency signal, in place of said tracking error signal, and by changing an offset thereof, when controlling the rotation speed after loading the optical disk into said apparatus, thereafter; a step for detecting a maximum value and a minimum value on a signal after conducting band pass filter process upon said lens shift indication signal obtained from said signal generator portion, when shifting the disk rotation speed to a high speed, and a step for determining on whether the disk rotation speed be shifted to the high speed or not, upon basis of a value obtained through comparison of said maximum value and said minimum value obtained with said greatest value and said smallest value memorized.

Also, according to the present invention, within the disk rotation speed control method of an optical disk apparatus as described in the above, preferably, renewal is made through detecting the maximum value and the minimum value of the signal obtained while conducting the band pass filter process on said lens shift indication signal, occasionally, or the predetermined high-frequency signal to be used in the place of said tracking error signal is a wobble signal. Or, the value obtained through comparison of said maximum value (Max_spnup) and said minimum value (Min_spnup) obtained with said greatest value (Max_step) and said greatest value (Min_step) memorized is expressed by the following equation:

$$X=(\text{Max\_}spnup-\text{Min\_}spnup)/(\text{Max\_step}-\text{Min\_step})$$

And, preferably, said signal process portion shifts into a tracking control mode after completing said mass eccentricity detection mode. In addition thereto, it is also preferable that said lens shift indication signal is the lens error signal.

According to the present invention as was mentioned above, it is possible to achieve the following effects, being superior in practical use thereof, with reducing leakage of the signal into the lens error signal, as well as, reducing various kinds of un-uniformities mentioned above, therefore, it is possible to conduct the disk rotation control with stability, while detecting the mass eccentricity of the optical disk, with certainty, and thereby providing the optical disk apparatus and the disk rotation control method thereof, enabling recording/reproducing of information of high quality onto/from the optical disk.

BRIEF DESCRIPTION OF THE DRAWINGS

Those and other objects, features and advantages of the present invention will become more readily apparent from the following detailed description when taken in conjunction with the accompanying drawings wherein.

DETAILED DESCRIPTION OF THE PREFERRED EMBODIMENTS

Hereinafter, embodiments according to the present invention will be fully explained by referring to the attached drawings.

Figure 1:
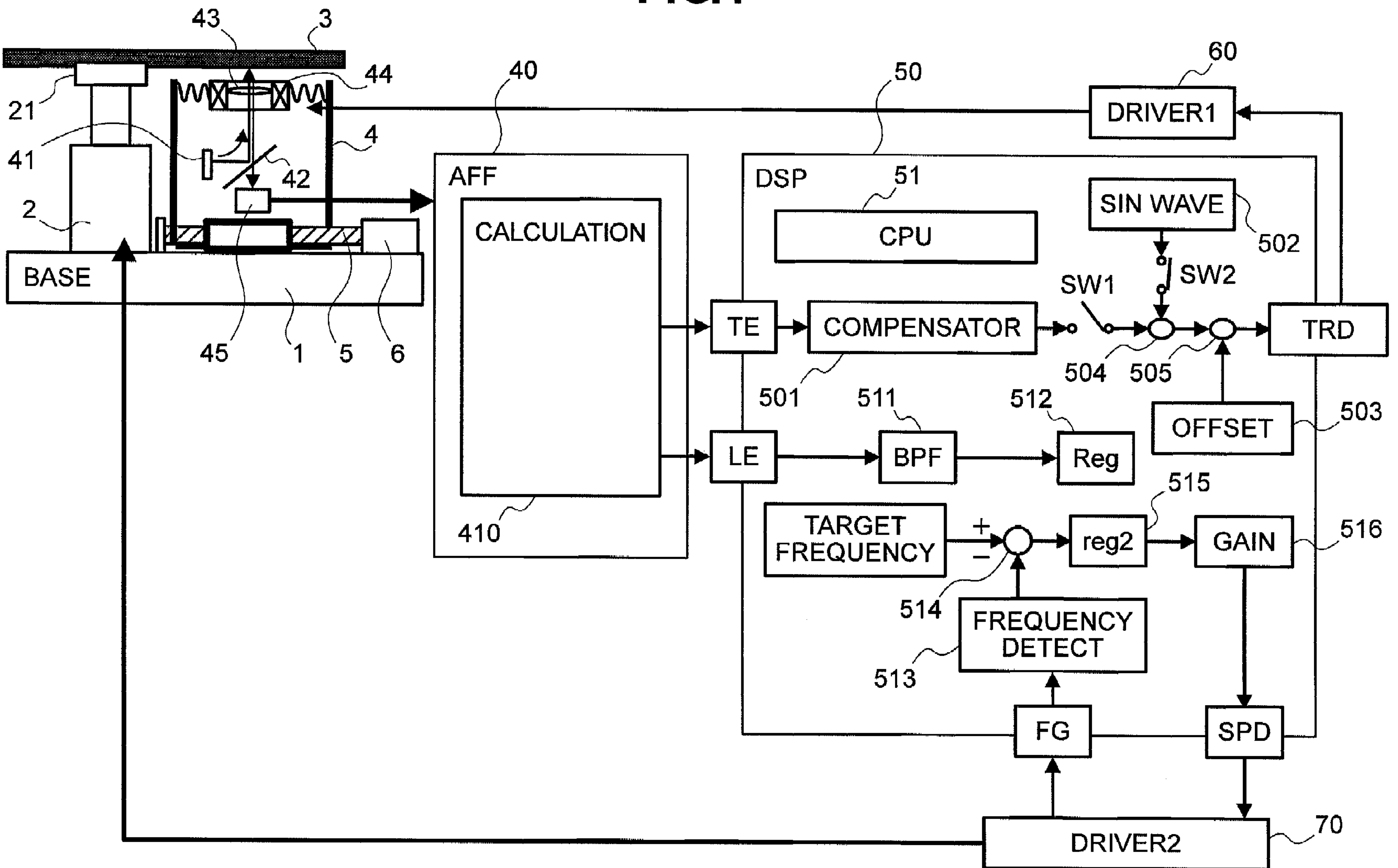
FIG. 1 is a block diagram for showing the outlook configuration of an optical disk apparatus, according to an embodiment of the present invention.

First of all, FIG. 1 attached herewith shows the inner structures of an optical disk apparatus, according to an embodiment of the present invention, and a reference numeral 1 in this figure depicts a base made of a thin metal plate or a plastic plate, for example, and on this base is mounted a spindle motor 2. On the other hand, onto a turntable 21 attached at a tip of this spindle motor is loaded an optical disk, i.e., an optical information recording medium for enabling recording/reproducing of information onto/from the recording surface thereof, thereby to be rotationally driven at a predetermined speed.

Also, in neighbor of the spindle motor 2, on this base 1 is attached so-called a pickup, comprising therein a semiconductor laser 41, being a light generating source, a half mirror 42 for guiding a laser beam to a predetermined direction through reflection/transmission, an objective lens 43 for condensing and irradiating the laser beam onto the information recording surface of the optical disk (the lower surface in the figure), a control mechanism 44 made from a voice coil or the like, for example, for finely controlling the position of that objective lens to the information recording surface of the optical disk 3, with using an electromagnetic force, and further a light detecting element 45, etc., for detecting a reflection light from that information recording surface through the objective lens, in a movable manner through a lack and pinion 5 or the like. Further, a reference numeral 6 in this figure depicts a motor, for moving that pickup 4 into the radial direction of the optical disk, through rotational drive of that rack and pinion.

On the other hand, in the right-hand side portion of this FIG. 1 are shown the structures for controlling the pickup 4 mentioned above, in particular, the position of the objective lens 43 thereof, as well as, the rotation speed of the spindle motor 2, i.e., the disk rotation speed, the pickup 4 mentioned above.

Thus, in the pickup 4 mentioned above, a signal detected by means of the light detecting element 45 for detecting the reflection light from the information recording surface of the optical disk 3 is inputted into an analog front end (AFE) portion 40. This AFE portion 40, being built up with a calculation portion 410 for conducting various kinds of analog calculations, carries out various kinds of processes on the signal, which is inputted from the light detecting element 45 into this analog front end (AFE) portion 40, and thereby generating a tracking error signal, a lens error signal and so on. Thereafter, the generated tracking error signal and lens error signal, after being converted into digital signals through an A/D converter, are inputted into a digital signal processor (DSP) portion 50, which will be explained below, to be treated with predetermined processing therein.

However, basically this DSP portion 50 is built up with a CPU, as being a calculating element, and also various kinds of elements, and in this FIG. 1, this DSP portion 50 is shown, in the form of, so-called a function block diagram, on the functions thereof.

In more details thereof, in this DSP portion 50 is provided a compensator 501 for inputting the tracking error signal therein, in relation to the tracking error signal from the AFE portion 40, and further a SIN wave generator 502 for generating a sinusoidal (SIN) wave of high frequency, for example, and an offset generator portion 503 for generating an offset signal. However, in this embodiment, the signal generated by this SIN wave generator 502 is used, in common with a wobble signal generated within the apparatus, however this SIN wave may be other signal, as far as it can achieve the object which will be mentioned below.

Also, among those portions are provided a switch SW1 for switching ON/OFF an output from that compensator and a switch SW2 for switching ON/OFF an output from that SIN wave generator circuit, and further adders 504 and 505, in the structures thereof. Thus the adder 504 selectively output the signal from that compensator 501 or the output from the SIN wave generator portion, through the switch SW1 or SW2, and within the adder 505 the signal is added with the offset signal from the offset generator portion 503, to be outputted into a driver circuit (DRIVER 1) 60 as a tracking driver (TRD) signal. As a result of this, the driver circuit (DRIVER 1) 60 controls the position of the objective lens in the pickup mentioned above, upon basis of this TRD signal.

On the other hand, in relation to the lens error signal from the AFE portion 40, firstly, there is provided a band pass filter (BPF) 511, and further, details of which will be mentioned later, a register (Reg) 512 for storing (memorizing) a greatest (or maximum) value and a smallest (or minimum) value of the lens error signal passing through that BPF 511 therein.

Further, this DSP portion 50, inputting a FG signal from a driver circuit (DRIVER 2) 70 for controlling the spindle motor 2 mentioned above therein, as being rotation information, it detects the frequency thereof within a frequency detector circuit 513, and input it into a minus (−) terminal of a subtractor 514. Thus, in this embodiment, the driver circuit (DRIVER 2) 70 has no sensor (i.e., sensor-less), and uses the FG signal extracted from the counter electromotive force of the spindle motor. On the other hand, onto a plus (+) terminal of this subtractor (i.e., a comparator) 514 is inputted a target frequency from a target frequency portion 225. As a result of this, difference between the target frequency and the frequency detected from the FG signal is stored into a second register (Reg 2) 515, and thereafter, after being amplified up to a predetermined gain within a gain setup portion 516, it is outputted to the driver circuit (DRIVER 2) 70, as the spindle driver (SPD) signal.

Figure 2:
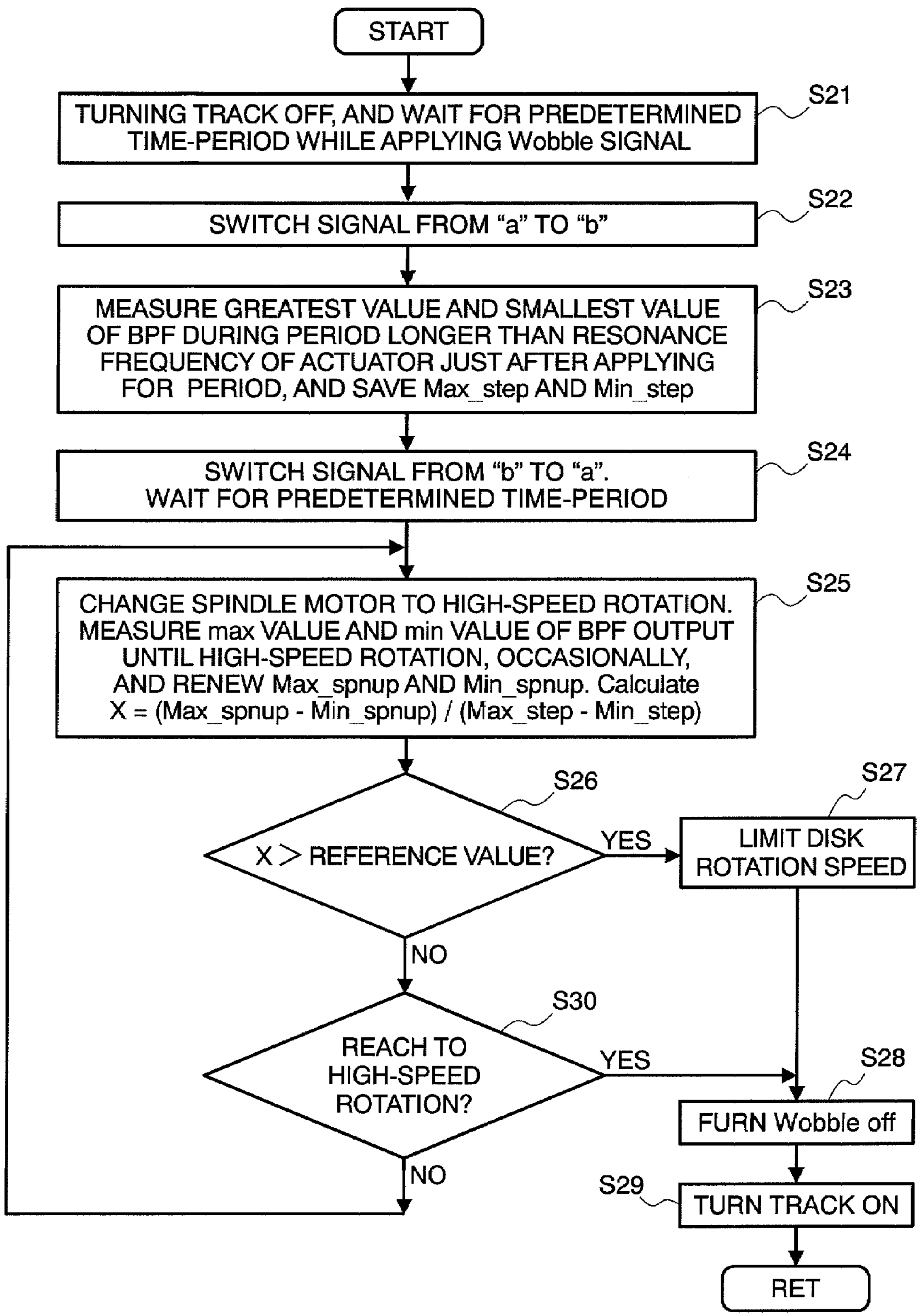
FIG. 2 is a flowchart for explaining the details of a disk rotation speed control method by taking the mass eccentricity of an optical disk into the consideration thereof, to be executed within the optical disk apparatus mentioned above.

Following to the above, explanation will be given on the details of the disk rotation speed control method, by referring to FIG. 2 attached herewith, which is executed within the optical disk apparatus, the structures of which was explained in the above, according to the present invention, by taking the mass eccentricity of the optical disk into the consideration thereof. However, this process is executed, appropriately, depending upon the necessity thereof, for example, when the optical disk is loaded into the apparatus, such as, when a Read command is issued after setting up the apparatus, by means of the CPU 51 of the DSP portion 50.

First, when starting, the process enters into a mode for detecting the mass eccentricity of the optical disk (i.e., a disk the mass eccentricity detection mode). In more details, the DSP portion 50 drives the spindle motor 2 at a low speed through the driver circuit (DRIVER 2) 70, and also the switch SW1 is turned OFF while turning the other switch SW2 ON. Thus, turning OFF of the switch SW1 shuts off the tracking error signal from the AFE portion 10, so as to bring the tracking control into OFF condition, while turning ON of the switch SW2 applies a wobble signal in the place of the tracking error signal, so as to produce a TRD signal, and thereby controlling the position of the objective lens of the pickup 4 on this TRD signal through the (DRIVER 1) 60 (i.e., a mode for detecting the mass eccentricity of the disk). However, in this instance, waiting is made for a predetermined time-period (S21). But, the predetermined time-period of this waiting is that from when the objective lens 43, being driven by the tracking error signal up to then, is released from the vibration through a spring, until when it comes to be stable, and it may be set at around 100 ms, sufficiently, for example, by taking the resonance frequency of an actuator into the consideration.

Following to the above, with switching the offset signal generated within the SIN wave generator 503 from “a” to “b”, a STEP response is executed (S22). However, in this instance, the reason why applying the wobble signal therein, as was mentioned above, is as follows.

Figure 3:
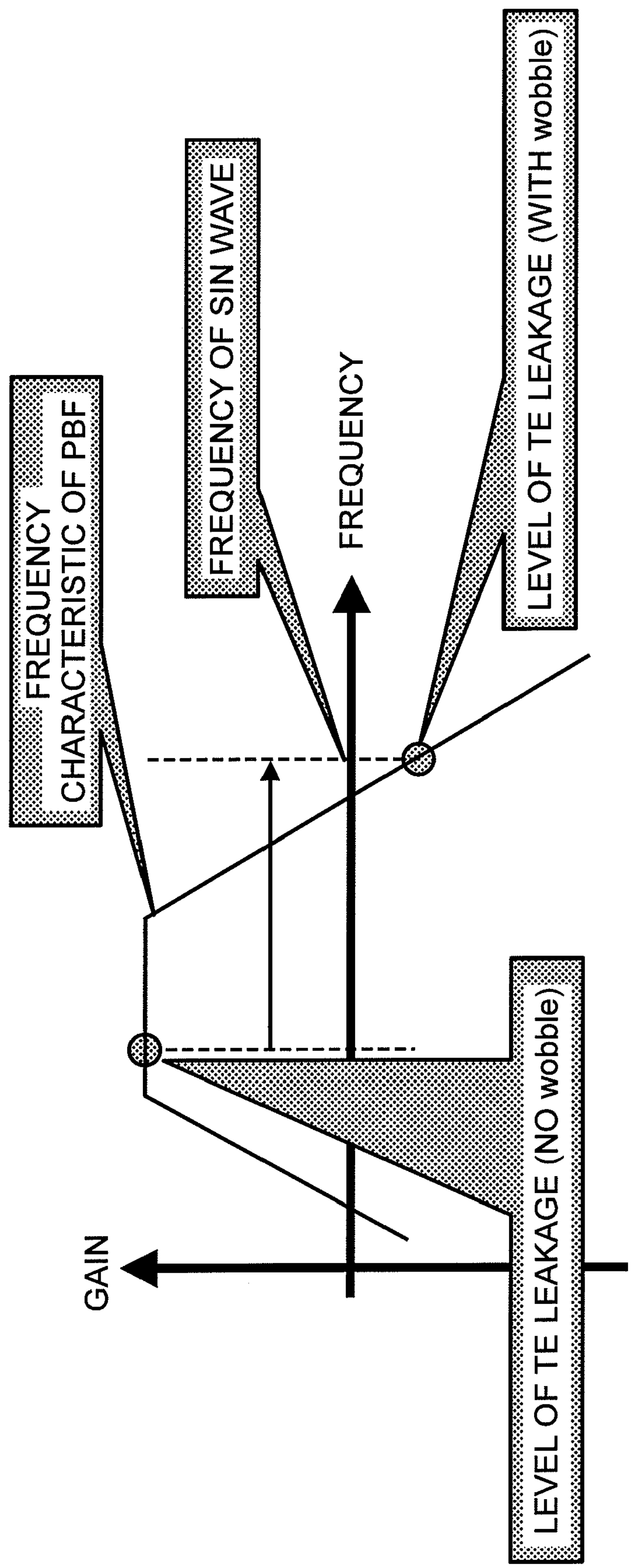
FIG. 3 is a view for explaining the principle of reducing the leakage of a tracking error signal in accordance with the disk rotation speed control method mentioned above.

Thus, as is shown in FIG. 3 attached herewith, the band pass filter (BPF) for conduction passing process onto the lens error signal has such a frequency-gain characteristics as is shown in the figure, and for that reason, the leakage level of the tracking error at issue falls within a passage region of the characteristics, and therefore, there is a problem that the mass eccentricity detected, erroneously.

Figure 4:
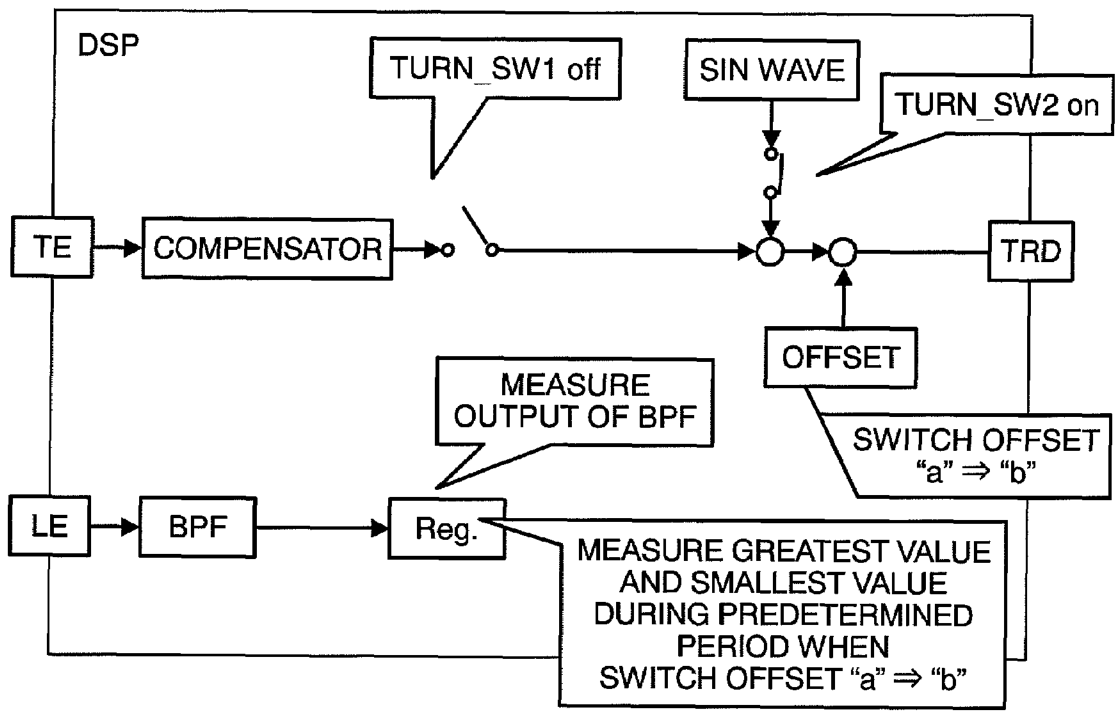
FIG. 4 is a view for showing the functional structures of a digital signal processor (DSP) of the optical disk apparatus shown in FIG. 1.
Figure 5:
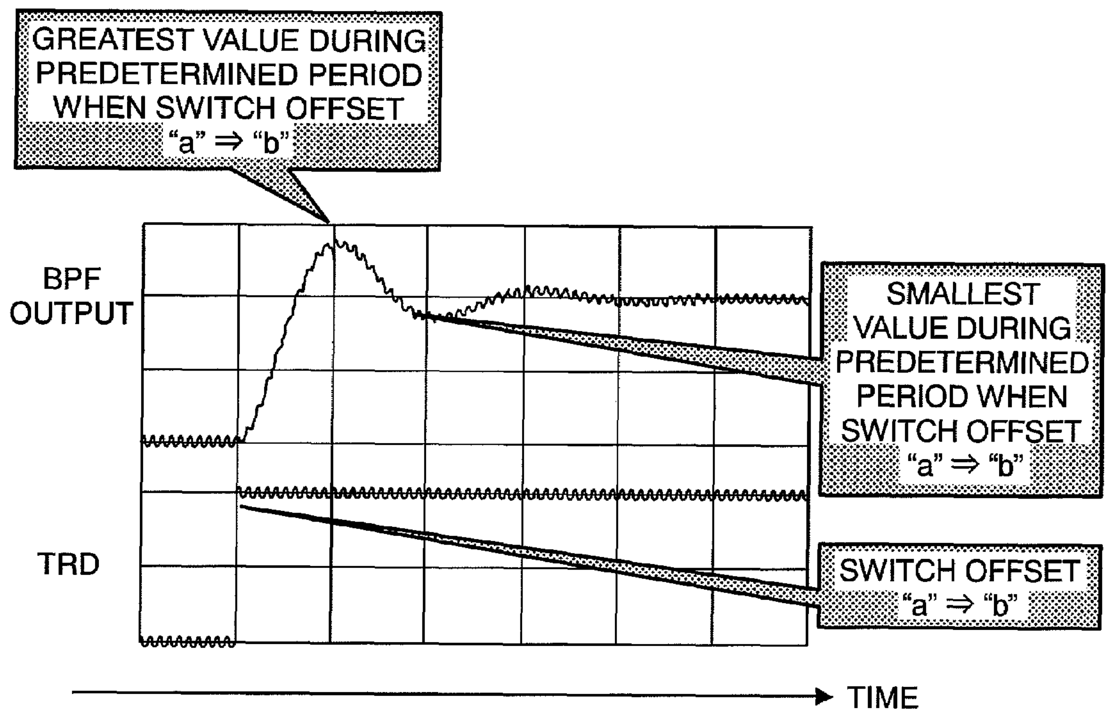
FIG. 5 a view for showing an example of the waveforms of a BPF output and a TRD signal within the structures shown in FIG. 4 mentioned above.

Then, as was mentioned above, application of the above-mentioned wobble signal, as the TRD signal, shits the leakage level of the tracking signal from the left-hand side towards the right-hand side on the figure (see “frequency of SIN wave” in the figure). Thus, with this, it is possible to set the leakage level of the tracking error signal within a blocking region, outside the passage region on the frequency characteristics of the band pass filter (BPF), with certainty, thereby enabling to detect the lens error signal under the condition of reducing the leakage of the tracking error signal, i.e., detection of an amount of volume of the lens shift responding to a step response, with certainty. Further, the condition of the DSP portion 50 in this instance is shown in FIG. 4 attached herewith, and an example of waveforms of the output (i.e., a BPF output) obtained from the band pass filter (BPF) 511 and the TRD signal, at this time, are shown in FIG. 5 attached herewith.

Herein, again, turning back to FIG. 2 mentioned above, according to the present invention, under the condition of being able to detect the amount of the lens shift responding to the step response, as was mentioned above, measurement is made only for a predetermined time-period (for example, about 20 ms), so as to detect the greatest value and the smallest value of the output from the band pass filter (BPF) 511, just after application of that step, and the detected values are saved (stored) into the register (Reg) 512, as "Max_step" and "Min_step", respectively (S23). However, the predetermined time-period in this instance may be equal to or larger than the resonance frequency of the pickup 4, as the actuator, in particular, of the driving mechanism including the base 1 therein, i.e., it may be determined appropriately, depending upon that driving mechanism. Thus, with such the processes S21-S23 as was mentioned above, reducing the leakage of the tracking error signal, including ill influences due to the un-uniformities (i.e., variations) in the sensitivity of the lens error signal and the actuator, it is possible to obtain the lens error signal responding to the step through the BPF 511. And, with using the maximum value and the minimum value of the output, which are obtained through this, thereafter it is possible to achieve the detection of the disk mass eccentricity, with much further accuracy and certainty, by comparing the amplitude of the BPF output (i.e., the lens error signal) when rotating the disk at high speed, with those greatest and smallest values, i.e., through the normalization.

Thus, after the process S23 mentioned above, for the purpose of bringing the optical disk apparatus into an initial condition, the offset signal from the offset generator portion 503 is switched from "b" back to the original value "a", and waiting is made for a predetermined time-period (S24). However, the predetermined time-period in this instance, being similar to the mentioned above, is the time until when the actuator comes to be stable, for example, around 20 ms. With this, applying the offset signal "a" of the initialization condition is onto the tracking error signal, so as to produce the TRD signal, the position of the objective lens of the pickup is controlled upon basis of this TRD signal through the driver circuit (DRIVER 1) 60.

Thereafter, the spindle motor 2 mentioned above is changed to a high-speed rotation through the driver circuit (DRIVER 2) 70, and measurement is made on the maximum value (i.e., a max value) and the minimum value (i.e., a min value) of the BPF, at any time, thereby to obtaining "Max_spnup" and "Min_spnup" (i.e., renew). And, from the maximum value and the minimum value obtained, the following value "X" is calculated out (S25).

$$X=(\mathrm{Max\_}spnup-\mathrm{Min\_}spnup)/(\mathrm{Max\_step}-\mathrm{Min\_step})$$

Thereafter, through comparison of the value "X" obtained in the above to a reference value, determination is made on whether it is larger or not than the reference value (S26). However, this reference value is that, which can determined in advance, through experiments or the like, for example, and in case when the value "X" exceeds this reference value, it is set at such a value that the disk cannot be shifted to the high-speed rotation, with stability, by taking the mass eccentricity of the disk into the consideration.

Namely, as a result of the determination S26 mentioned above, if it is determined that the value "X" exceeds the reference value ("Yes"), the disk rotation speed is restricted at that value (S27), but without changing the spindle motor 2 to the high-speed rotation. Thereafter, generation of the wobble signal within the SIN wave generator 502 is stopped (i.e., being turned OFF) (S28), and further a tracking servo is turned ON (i.e., track ON), again (S29). In more details, the switch SW1 mentioned above is closed (i.e., turned ON), while the other switch SW2 is opened (i.e., turned OFF). Thus, the operation is escaped from a mode for detecting the mass eccentricity of the disk (i.e., a disk mass eccentricity detection mode). With this, the optical disk apparatus restarts the tracking control, again, with using the tracking error signal from the AFE portion 10 (i.e., constitution of a tracking loop), and enables the recording/reproducing operation of information onto/from the optical disk.

On the other hand, in case where the value "X" does not exceed the reference value ("No"), then further determination is made on whether the spindle motor 2 reaches or not up to a high rotation speed (i.e., a target frequency), which is determined in advance (S30). As a result of this, if it does not reach to the target value yet ("No"), then the operation turns back to the above-mentioned process S25, again, thereby changing the spindle motor 2 up to the further high rotation speed and calculating out the value "X" mentioned above, to as to repeat the above-mentioned processes S26 and S27. Thus, again, when the determination is made that the value "X" exceeds the reference value ("Yes"), as a result of the process S26, the disk rotation speed is restricted at that value (S27), and further the processes S28 and S29 are repeated. On the other hand, as a result of the process S27, if determining that the rotation speed of the spindle motor 2 reaches to the target value thereof ("Yes"), then the above-mentioned processes S28 and S29 are executed, and thereby completes a series of those processes.

However, in the above, those processes up to the time when the spindle motor 2 reaches up to the target high-rotation speed can be conducted, in more details thereof, through checking on whether the value thereof is turned to "0" or not, within the second register (Reg 2) 515, which inputs the frequency detected from the FG signal and the target frequency through the subtractor (i.e., the comparator) 514. Also, the change of the spindle motor 2 to the high-speed rotation is carried out by means of the gain setup portion 516 shown in FIG. 1 mentioned above.

As was fully explained in the above, with the optical disk apparatus adopting therein the disk rotation speed control method by taking the mass eccentricity of the optical disk into the consideration thereof, it is possible to reduce the leakage of signal into the lens error signal, with certainty, as well as, reduce the various kinds of un-uniformities mentioned above, in particular, of the actuator, so as to detect the mass eccentricity of the disk, with certainty, for achieving the stable disk rotation speed control, and thereby enabling the superior recording/reproducing of information onto/from the optical disk.

However, in the explanation given in the above, as was mentioned previously, for reducing the leakage of signal into the lens error signal, with certainty, it is explained that the TRD signal is generated from the wobble signal of the high-frequency sinusoidal (SIN) wave from the SIN wave generator 502, however according to the present invention, it should not be restricted to this, but other than that, it is also possible to use a signal, as far as it has the frequency characteristic coming off from the passage region within the frequency characteristics of the BPF 511 for process of passing the lens error signal. Also, in the embodiment mentioned above, though mentioning was made only about the example of detecting the lens error signal, as the signal indicative of the lens shift of the tracking actuator ("the lens shift indication signal"), however according to the present invention, it should not be restricted to this, but it is apparent for the person skilled in the art, that the similar effect(s) can be obtained by detecting this from the tracking error signal, other than that, through conducting the similar processes thereon.

In addition thereto, although the explanation was made, the reference value to be compared to the value "X" in the determining process S26 mentioned above is the value of one (1) piece, however it may be in a plural number thereof. Also, this reference value was explained to be determined through the experiments or the like, in advance, for example, but in the place thereof, it may be automatically determined, appropriately, with using the learning control, for example.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. An optical disk apparatus, comprising:

a spindle motor to mount an optical disk thereon, for rotational driving thereof;

a pickup movable into a radial direction of the optical disk being rotationally driven by said spindle motor;

rotation speed control means for controlling a rotation speed of said spindle motor;

pickup movement controller means for controlling movement of said pickup, thereby recording/reproducing information through irradiating a laser beam upon an information recording surface of the optical disk;

a signal generator portion for generating at least a tracking error signal and a lens shift indication signal upon reflected light of the laser beam irradiated from said pickup; and a signal process portion for controlling said rotation speed control means and said pickup movement controller means, upon basis of the tracking error signal and the lens shift indication signal from said signal generator portion, wherein said signal process portion comprises a mass eccentricity detection mode, detecting a greatest value and a smallest value on a signal after conducting a band pass filter process upon said lens shift indication signal in a step response of said pickup, to be memorized, with using a predetermined high-frequency signal, in place of said tracking error signal, and by changing an offset thereof, when controlling the rotation speed after loading the optical disk, and thereafter, detecting a maximum value and a minimum value on a signal after conducting band pass filter process upon said lens shift indication signal obtained from said signal generator portion, when shifting the disk rotation speed to a high speed, and thereby determining on whether the disk rotation speed be shifted to the high speed or not, upon basis of a value obtained through comparison of said maximum value and said minimum value obtained with said greatest value and said smallest value memorized.

2. The optical disk apparatus as claimed in claim 1, wherein said signal process portion has memory means for memorizing the greatest value and the smallest value.

3. The optical disk apparatus as claimed in claim 1, wherein the predetermined high-frequency signal to be used in place of said tracking error signal is a wobble signal.

4. The optical disk apparatus as claimed in claim 1, wherein the value obtained through comparison of said maximum value (Max_spnup) and said minimum value (Min_spnup) obtained to said greatest value (Max_step) and said smallest value (Min_step) memorized is expressed by the following equation:

$$X=(\mathrm{Max\_}spnup-\mathrm{Min\_}spnup)/(\mathrm{Max\_step}-\mathrm{Min\_step}).$$

5. The optical disk apparatus as claimed in claim 1, wherein said signal process portion shifts into a tracking control mode after completing said mass eccentricity detection mode.

6. The optical disk apparatus as claimed in claim 1, wherein said lens shift indication signal is the lens error signal.

7. A disk rotation speed control method in an optical disk apparatus, comprising: a spindle motor to mount an optical disk thereon, for rotational driving thereof; a pickup movable into a radial direction of the optical disk being rotationally driven by said spindle motor; a rotation speed control means for controlling a rotation speed of said spindle motor; and a pickup movement controller means for controlling movement of said pickup, thereby recording/reproducing information through irradiating a laser beam upon an information recording surface of the optical disk, comprising the following steps of:

a step for detecting a greatest value and a smallest value on a signal after conduction a band pass filter process upon said lens shift indication signal in a step response of said pickup, to be memorized, with using a predetermined high-frequency signal, in place of said tracking error signal, and by changing an offset thereof, when controlling the rotation speed after loading the optical disk into said apparatus, thereafter;

a step for detecting a maximum value and a minimum value on a signal after conducting band pass filter process upon said lens shift indication signal obtained from said signal generator portion, when shifting the disk rotation speed to a high speed, and a step for determining on whether the disk rotation speed be shifted to the high speed or not, upon basis of a value obtained through comparison of said maximum value and said minimum value obtained with said greatest value and said smallest value memorized.

8. The disk rotation speed control method as claimed in claim 7, wherein renewal is made through detecting the maximum value and the minimum value of the signal obtained while conducting the band pass filter process on said lens shift indication signal, occasionally.

9. The disk rotation speed control method as claimed in claim 7, wherein the predetermined high-frequency signal to be used in place of said tracking error signal is a wobble signal.

10. The disk rotation speed control method as claimed in claim 7, wherein the value obtained through comparison of said maximum value (Max_spnup) and said minimum value (Min_spnup) obtained to said greatest value (Max_step) and said smallest value (Min _step) memorized is expressed by the following equation:

$$X=(\mathrm{Max\_}spnup-\mathrm{Min\_}spnup)/(\mathrm{Max\_step}-\mathrm{Min\_step}).$$

11. The disk rotation speed control method as claimed in claim 7, wherein said signal process portion shifts into a tracking control mode after completing said mass eccentricity detection mode.

12. The disk rotation speed control method as claimed in claim 7, wherein said lens shift indication signal is the lens error signal.

* * * * *